(12) United States Patent
Lu et al.

(10) Patent No.: US 7,583,001 B2
(45) Date of Patent: Sep. 1, 2009

(54) ELECTRIC MOTOR DESIGN FOR IN HUB MOTORS

(75) Inventors: Chun-Hsien Lu, Hsinchu (TW); Huan-Lung Gu, Hsinchu (TW); Chi-Tang Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/034,662

(22) Filed: Jan. 12, 2005

(65) Prior Publication Data

US 2006/0113859 A1 Jun. 1, 2006

(51) Int. Cl.
*H02K 1/18* (2006.01)
*H02K 1/27* (2006.01)

(52) U.S. Cl. ............... 310/216; 310/259; 310/67 R; 310/156.12; 310/217; 310/218

(58) Field of Classification Search ................ 310/254, 310/259, 258, 261, 154.12, 154.37, 156.01, 310/156.12, 156.35, 156.48, 12, 67 R, 75 C, 310/67 A, 216, 217, 218; 180/65.1, 65.5
See application file for complete search history.

(56) References Cited

U.S. PATENT DOCUMENTS

| | | | | |
|---|---|---|---|---|
| 2,506,146 | A * | 5/1950 | Gladish | 310/67 R |
| 4,491,769 | A * | 1/1985 | Heidelberg | 318/254 |
| 4,835,839 | A * | 6/1989 | Forbes et al. | 29/596 |
| 5,142,178 | A * | 8/1992 | Kloster et al. | 310/217 |
| 5,670,838 | A * | 9/1997 | Everton | 310/254 |
| 5,757,108 | A * | 5/1998 | Suzuki | 310/49 R |
| 5,796,190 | A * | 8/1998 | Takeda et al. | 310/58 |
| 6,093,984 | A * | 7/2000 | Shiga et al. | 310/26 |
| 6,140,728 | A * | 10/2000 | Tomita et al. | 310/156.12 |
| 6,219,900 | B1 * | 4/2001 | Suzuki | 29/598 |
| 6,300,700 | B1 * | 10/2001 | Nishiyama et al. | 310/156.45 |
| 6,304,019 | B1 * | 10/2001 | Tsai | 310/254 |
| 6,407,471 | B1 * | 6/2002 | Miyamoto et al. | 310/12 |

(Continued)

FOREIGN PATENT DOCUMENTS

JP 61-77648 U * 5/1986

(Continued)

OTHER PUBLICATIONS

Machine translation of JP 2002/233,122. Sumiya et al. Aug. 2002.*

(Continued)

*Primary Examiner*—Karl I Tamai
(74) *Attorney, Agent, or Firm*—Pro-Techtor Int'l Services; Ralph Willgohs (57) ABSTRACT

An electric motor design for hub motors comprises a stator assembly, having an axle, a stator plate sector holder, fixed on the axle, at least one stator sector assembly, mounted on the stator plate holder, and electric coils, would around the plates of the stator plate assembly; and a rotor assembly, having a casing, a rotor magnet retainer assembly, placed inside of the casing, and at least one permanent magnet, mounted on plates of the rotor magnet retainer assembly; wherein the stator sector assembly and/or the rotor magnet retainer assembly have plates which are stacked on top of each other and which are each divided into at least two sectors, saving production cost.

8 Claims, 9 Drawing Sheets

U.S. PATENT DOCUMENTS

| | | | |
|---|---|---|---|
| 6,487,769 B2 * | 12/2002 | Ketterer et al. | 29/596 |
| 6,515,397 B1 * | 2/2003 | Schmid | 310/217 |
| 6,661,147 B2 * | 12/2003 | Tajima et al. | 310/216 |
| 6,707,225 B2 * | 3/2004 | Bradfield | 310/260 |
| 6,710,505 B1 * | 3/2004 | Barani et al. | 310/261 |
| 6,727,628 B2 * | 4/2004 | Shimada et al. | 310/216 |
| 6,784,575 B2 * | 8/2004 | Okuda | 310/58 |
| 6,822,364 B2 * | 11/2004 | Suzuki et al. | 310/218 |
| 6,844,650 B2 * | 1/2005 | Hirano et al. | 310/198 |
| 6,879,078 B2 * | 4/2005 | Wolters | 310/217 |
| 6,897,591 B2 * | 5/2005 | Peachee et al. | 310/166 |
| 6,975,057 B2 * | 12/2005 | Gauthier et al. | 310/218 |
| 7,019,433 B2 * | 3/2006 | Hashimoto et al. | 310/259 |
| 2003/0098628 A1 * | 5/2003 | Enomoto et al. | 310/218 |
| 2003/0160537 A1 * | 8/2003 | Hsu | 310/254 |
| 2004/0160141 A1 * | 8/2004 | Dube | 310/218 |
| 2006/0113859 A1 * | 6/2006 | Lu et al. | 310/218 |

FOREIGN PATENT DOCUMENTS

| | | | |
|---|---|---|---|
| JP | 08-182231 | * | 7/1996 |
| JP | 11-113195 | * | 4/1999 |
| JP | 11-146581 | * | 5/1999 |
| JP | 2000-184643 | * | 6/2000 |
| JP | 2001-045684 | * | 2/2001 |
| JP | 2001-211574 | * | 8/2001 |
| JP | 2001251792 | * | 9/2001 |
| JP | 2002/233122 | * | 8/2002 |
| JP | 2003/199270 | * | 7/2003 |

OTHER PUBLICATIONS

Manual translation of JP 2002-233122, Aug. 16, 2002, Kadotani et al.*
Manual translation of JP 11-113195, Apr. 23, 1999, Takeda et al.*
Manual translation of JP 11-146581, May 28, 1999, Osada.*
Machine translation of JP 2000-184673, "outer rotor for wheel-in motor", Iga et al., Jun. 30, 2000.*

* cited by examiner

ELECTRIC MOTOR DESIGN FOR IN HUB MOTORS

BACKGROUND OF THE INVENTION

1. Field of the Invention

The present invention relates to an electric motor, particularly to an electric hub motor in which rotor and stator plates divided in several sections are substituted for a conventional rotor and stator plates in single pieces. Thereby cost of molding and waste material are greatly reduced and unused material of other processes is usable, resulting in a significant cost advantage.

2. Description of Related Art

In conventional art, brushless peripheral-rotor motors, in which rotors are placed outside stators, are widely used in hubs of electric vehicles and washing machines. Motors of this type have inner stators with a plurality of electric coils connected with power. During operation as an electric generator, a rotating external magnetic field results in the generation of electric current. In each motor of this type, the rotor has a larger diameter than the stator and is provided with a plurality of permanent magnets. Usually, the rotor is made of a curved rotor plate in which the stator is inserted. Various ways of placing the permanent magnets in the rotor are used, which are mainly decided by cost. Accurate positions of the permanent magnets in the rotor plate are important for proper functioning of the motor.

There are mainly two conventional methods of making rotors. In the first, a rotor body is made in a single piece on a lathe, with inner peripheral grooves being cut out. Into each of the inner peripheral grooves a permanent magnet is laid. Since cutting of the inner peripheral grooves and automatic inserting of the permanent magnets is difficult, the permanent magnets are usually glued to an inner periphery of the rotor body. This method, however, is expensive and often results in errors of production. Furthermore, since the permanent magnets are glued to metal, magnetic flux is reduced by some degree. In the second method, rotor plates are produced by punching. Using silicon steel leads to better magnetic properties and a higher magnetic flux. Several rotor plates are inserted in a casing. By the rotor having several plates, cutting grooves is facilitated and working is easy. Choosing appropriate shapes for the rotor plates results in good magnetic properties and high effectivity in conjunction with the stator coils. However, since the rotor plates have relatively large diameters, large punching machines are required, and punching produces large quantities of waste material, leading to high cost of production.

SUMMARY OF THE INVENTION

It is the object of the present invention to provide an electric motor which is easy to produce and which is manufactured at low cost and with little waste material.

The electric motor of the present invention has a stator and a rotor, both of which have plates that are divided into several sectors. The sectors are made by punching at high precision and are automatically assembled, facilitating automatic inserting of permanent magnets.

The present invention can be more fully understood by reference to the following description and accompanying drawings.

DETAILED DESCRIPTION OF THE PREFERRED EMBODIMENTS

Figure 1:
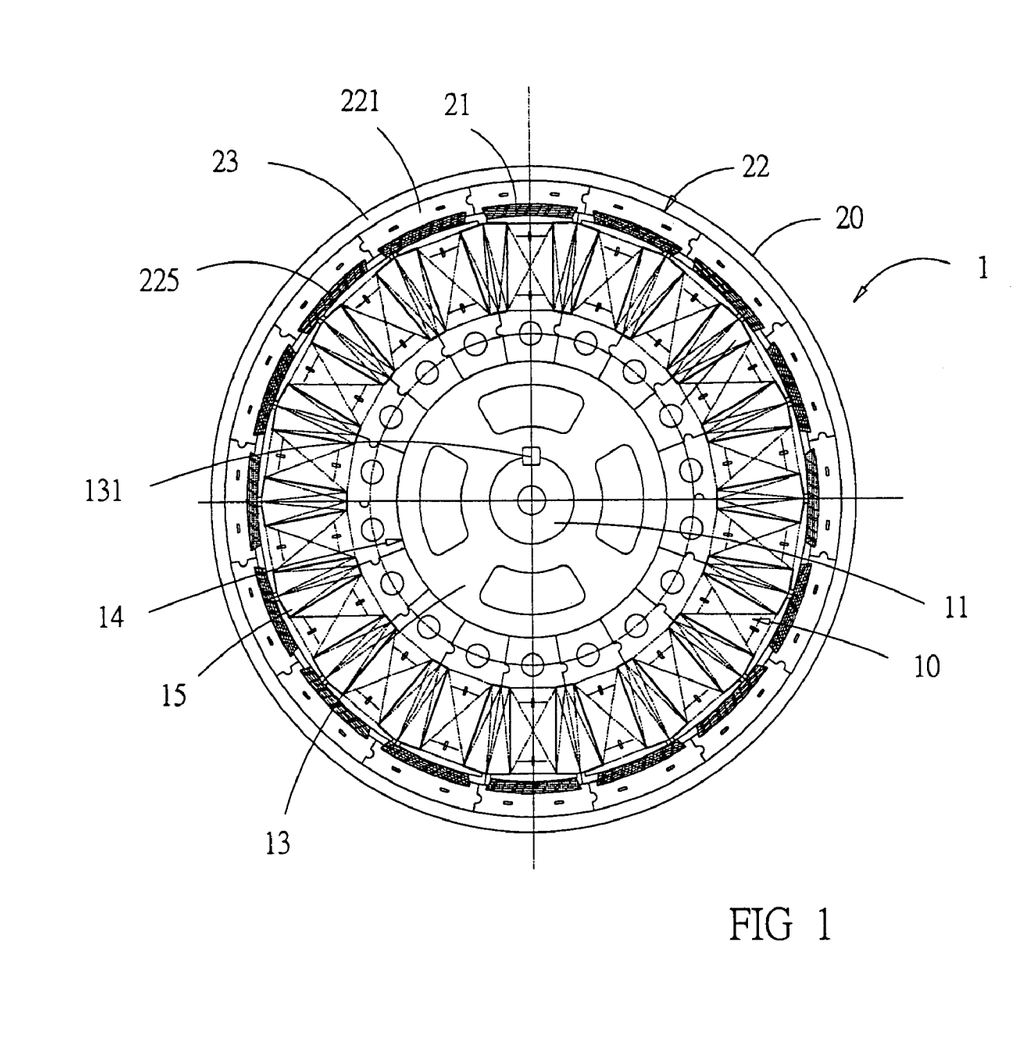
FIG. 1 is a front view of the electric motor of the present invention.
Figure 2:
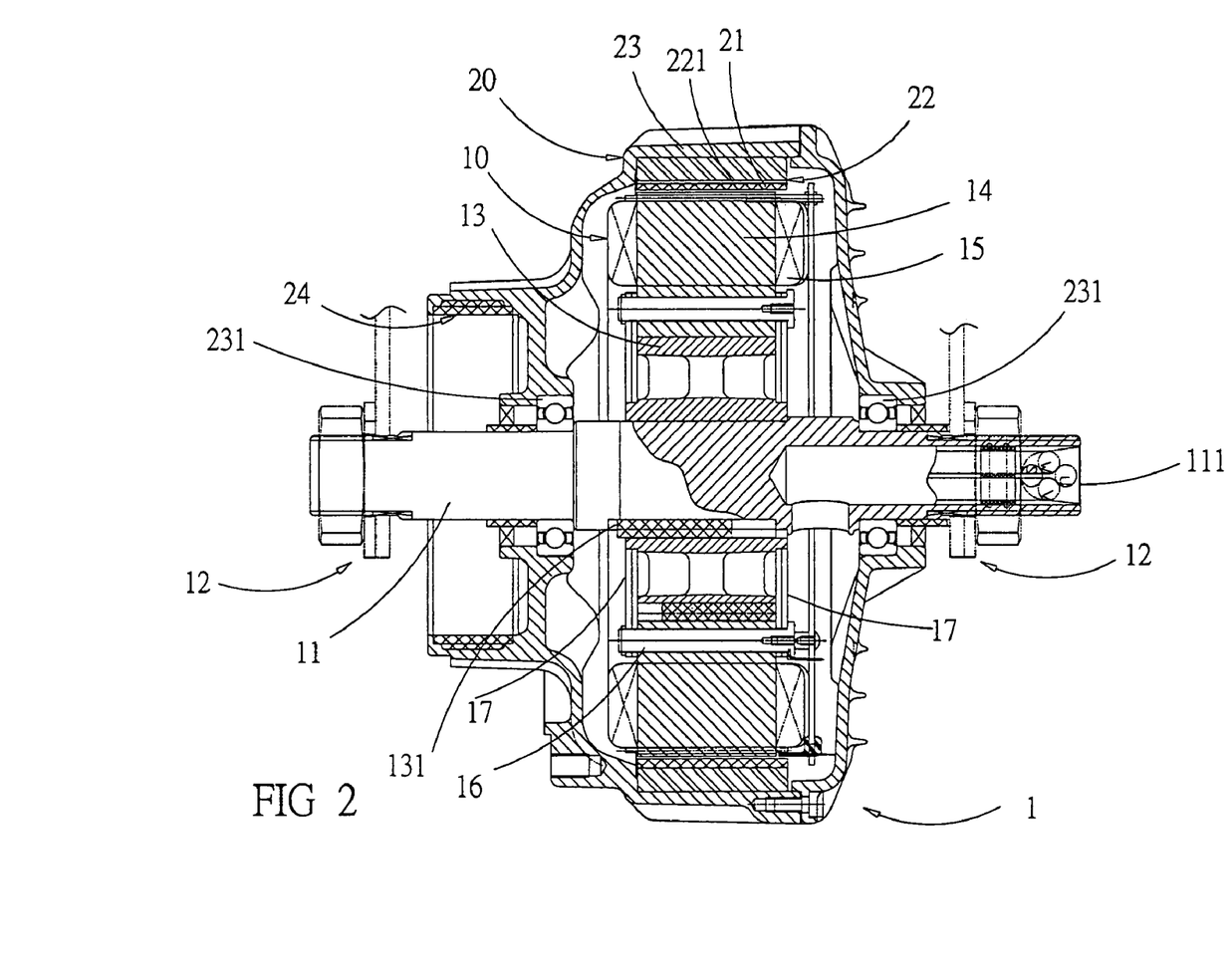
FIG. 2 is a top view of the electric motor of the present invention.
Figure 3A:
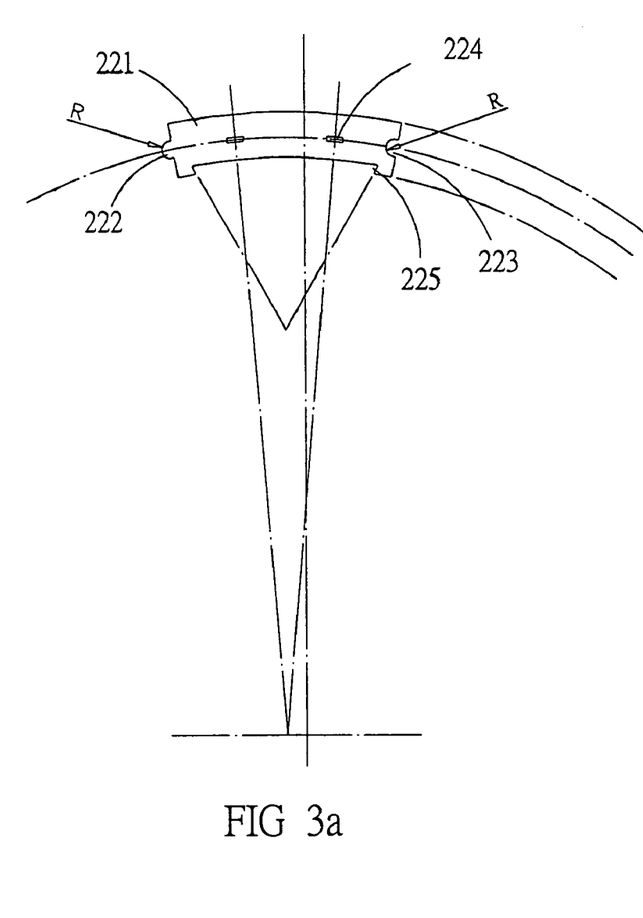
FIGS. 3a and 3b are front and side views of one of the rotor plate sectors of the present invention.
Figure 3B:
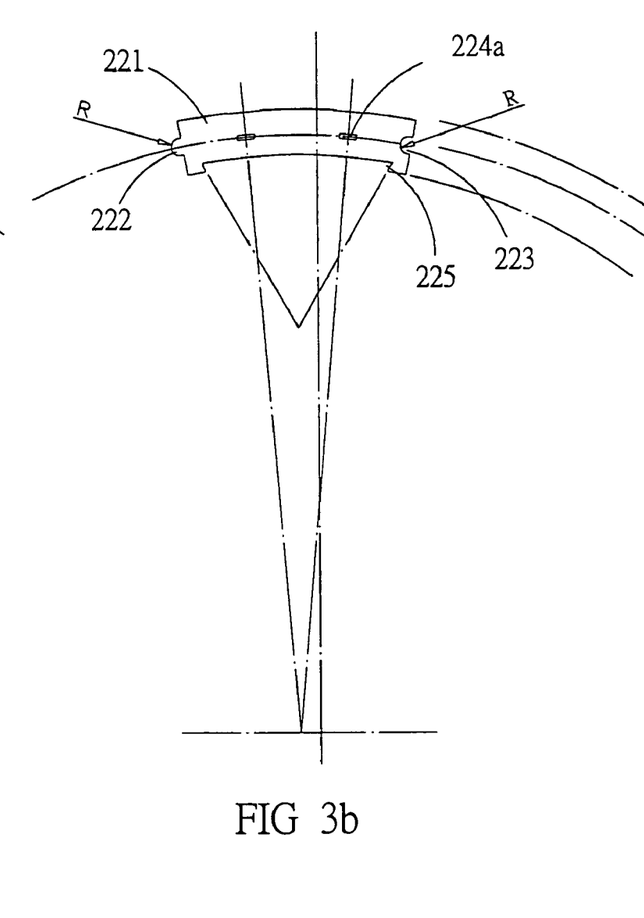
Figure 4:
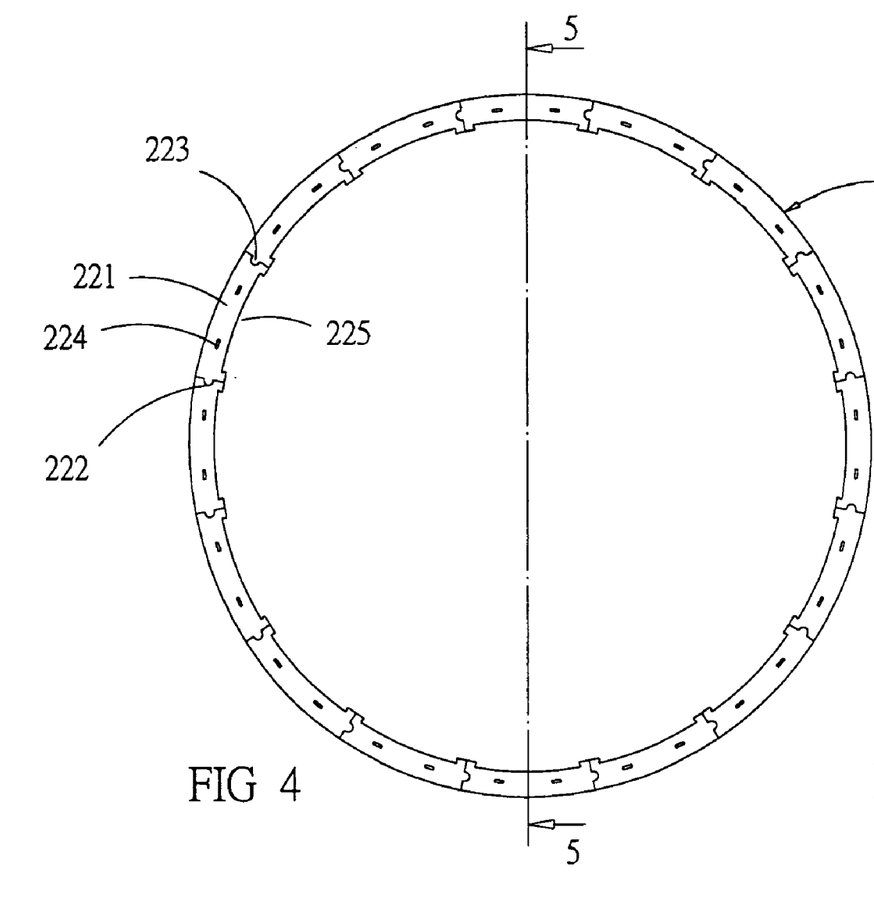
FIG. 4 is a front view of the rotor plate assembly of the present invention.
Figure 5:
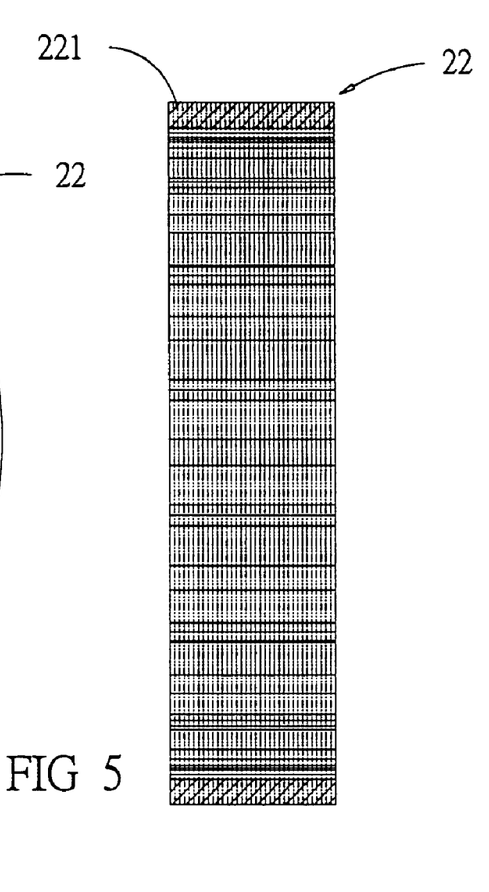
FIG. 5 is a cross-sectional view taken along line 5-5 of FIG. 4.

As shown in FIGS. 1 and 2, the electric motor of the present invention has a rotor that surrounds a stator, working as a motor or as an electricity generator. The following explanation takes a motor used in a hub of an electric vehicle or in a washing machine as an example. The electric motor 1 of the present invention comprises: A stator assembly 10, having electric coils 15; and a rotor assembly 20, having permanent magnets 21. The rotor assembly 20 is made of a plurality of rotor plates stacked on top of each other, and the stator assembly 10 is made of a plurality of stator plates stacked on top of each other. The rotor plates and the stator plates are each divided into a plurality of sectors, resulting in easy manufacturing at low cost. In the following, a detailed explanation is given.

The stator assembly 10 has a stator axle 11 with two ends that are fastened to a stator frame 12. A stator plate sector holder 13 is by a bolt 131 fixed to the stator axle 11, and is made of material that allows for effective dissipation of heat, like aluminum. Moreover, cooling by gas or liquid is possible to dissipate heat generated in the stator assembly 10 during operation. The stator plate sector holder 13 carries a stator sector assembly 14. Electric coils 15 are wound on plates of the stator sector assembly 14 and on opposite sides fixed thereon. The plates of the stator sector assembly 14 are fastened by bolts 16 or screws on fastening plates 17 on the stator plate sector holder 13. The electric coils 15 are supplied with electric currents through holes 111 in the stator axle 11. Electric current flowing through the electric coils 15 generates a radially oriented magnetic field, which interacts with the magnetic field of the permanent magnets 21. Gaps are left between the electric coils 15 and the permanent magnets 21, so that the permanent magnets 21 are able to move unhindered by the stator sector assembly 14.

The rotor assembly 20 comprises the permanent magnets 21, a rotor magnet retainer assembly 22, and a casing 23. The permanent magnets 21 are mounted on the inward surface of the rotor magnet retainer assembly 22, and the rotor-magnet retainer assembly 22 is fitted into the casing 23, forming an integral body. The casing 23 has two sides that are mounted on a shaft 231, allowing the rotor assembly freely to rotate on the stator axle 11. A brake drum 24 is attached to an opposite side of the rotor assembly 20, having a brake shoe (not shown) for stopping a rotating movement of the rotor assembly 20.

In the interaction between the stator assembly 10 and the rotor assembly 20, the permanent magnets 21 are driven by the rotating magnetic field generated by the electric coils 15. On the other hand, if the casing 23 is rotated against the stator assembly 10, the rotating magnetic field of the permanent magnets 21 generates an electric current in the electric coils 15.

Referring to FIGS. 3-6, rotor magnet retainer assembly 22 comprises a plurality of plates stacked on top of each other. Each plate of the rotor magnet-retainer assembly 22 consists of at least two rotor plate sectors 221. Each rotor plate sector 221 has two edges connecting to a neighboring rotor plate sector 221, on which a protrusion 222 and a recess 223 are respectively placed. Connecting the protrusions 222 and recesses 223 forms a plate, and stacking plates on top of each other forms the rotor magnet retainer assembly 22. Each of the rotor plate sectors 221 has positioning elongated alignment ridges 224 composed of circular, square or other suitable shapes and positioning alignment valleys 224a at an opposite side, allowing to stack plates on each other, so that the rotor magnet retainer assembly 22 has a predetermined thickness. Furthermore, each of the rotor plate sectors 221 has a inner side in which holding recesses 225 for accommodating the permanent magnets 21 are cut. The rotor plate sectors 221 are manufactured by punching, using silicon steel as material for favorable magnetic properties.

Figures 7A, 7B:
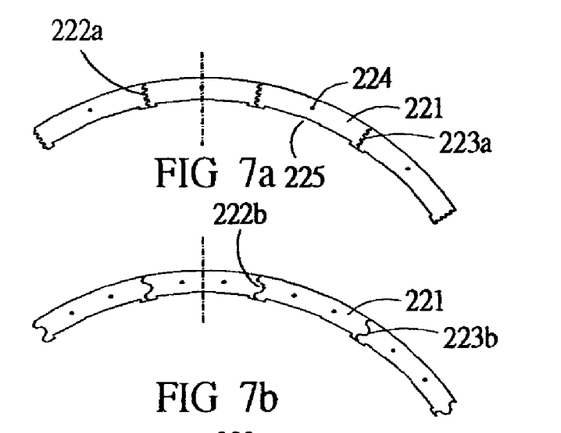
FIGS. 7a-7f are front views of the present invention in other embodiments.
Figure 7C:
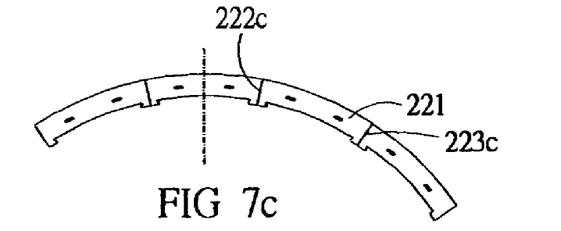
Figure 7D:
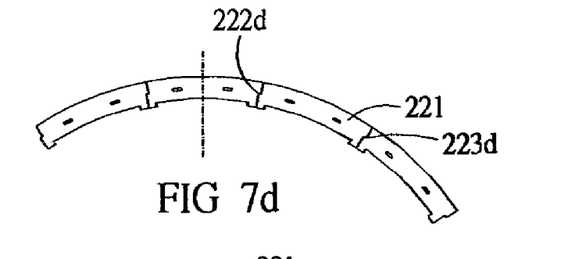
Figure 7E:
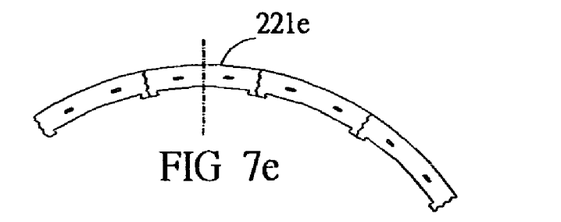
Figure 7F:
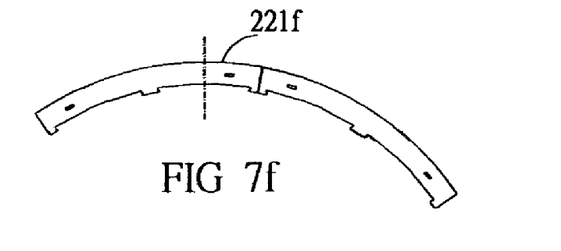

For each of the rotor plate sectors 221, the protrusions 222 and a recess 223 are of any suitable shape. As shown in FIGS. 7a-7d, in various embodiments of the present invention, protrusions 222a and recesses 223a of zigzagging shapes, protrusions 222b and recesses 223b of embossed shapes, protrusions 222c and recesses 223c of linear shapes, or protrusions 222d and recesses 223d of waving shapes are used. Furthermore, as shown in FIGS. 7e and 7f, a rotor plate sector 221e accommodates one permanent magnet 21, or a rotor plate sector 221f accommodates several permanent magnets 21.

Figure 6:
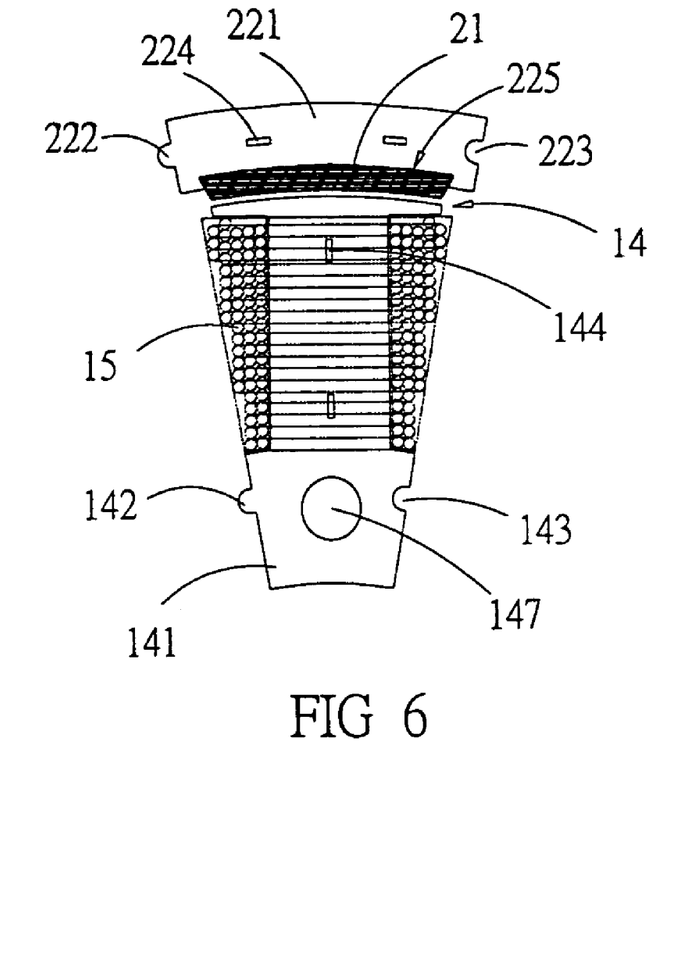
FIG. 6 is a partial sectional view of one of the rotor plate sectors and one of the stator plate sectors of the present invention.
Figure 8A:
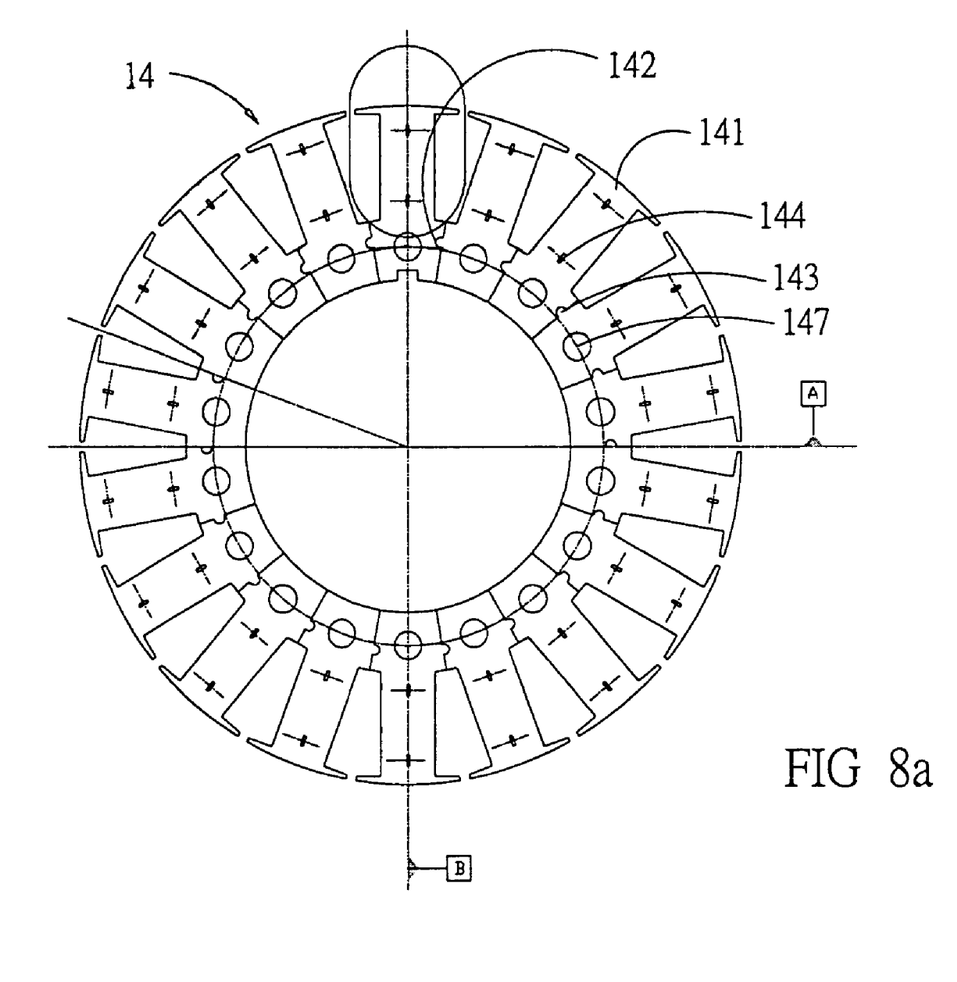
FIGS. 8a and 8b are front and side views of one of the stator plate sectors of the present invention.
Figure 8B:
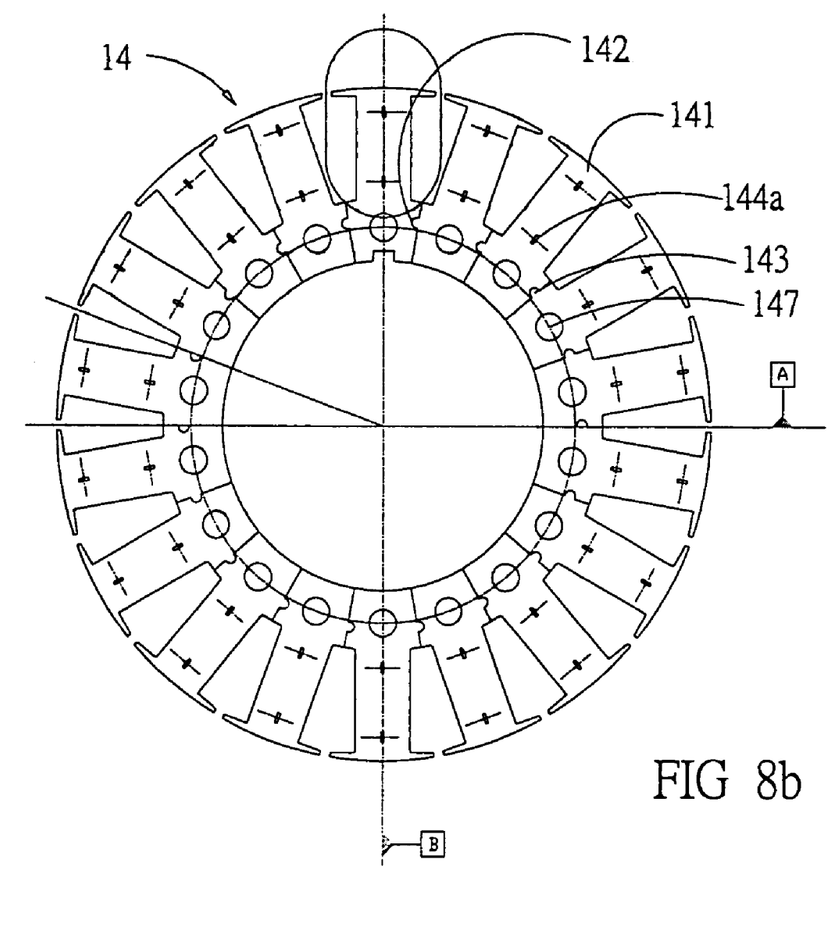
Figure 9:
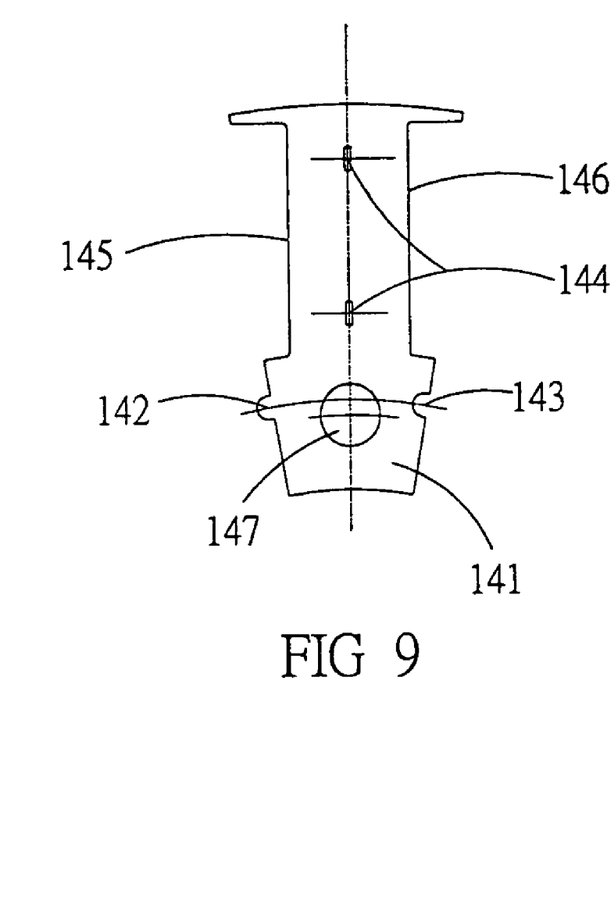
FIG. 9 is a front view of the stator plate assembly of the present invention.
Figure 10:
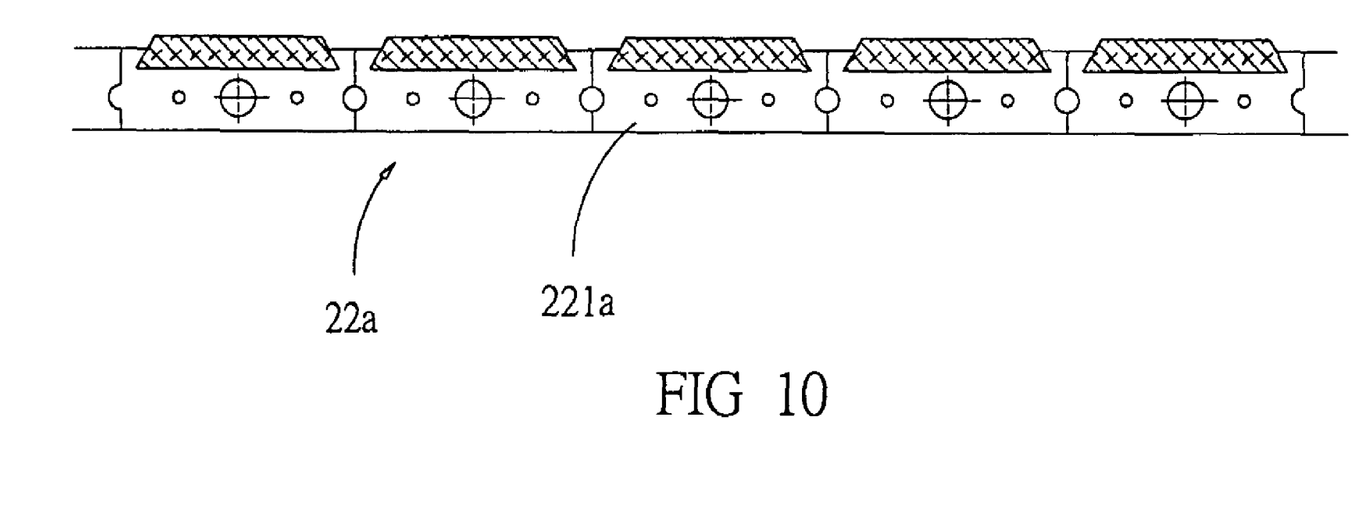
FIG. 10 is a front view of the rotor plate assembly of the present invention in another embodiment.

Referring to FIGS. 6, 8 and 9, the electric coils 15 have a number of magnetic poles that is selected to be compatible with the number of magnetic poles of the permanent magnets 21, so that a field difference results. Each of the electric coils 15 is separately wound on a sector of the stator plate assembly 14. The stator sector assembly 14 has plates that are made of silicon steel with good magnetic properties and are preferably stacked on each other. Each plate of the stator sector assembly 14 consists of at least two stator plate sectors 141. Each stator plate sector 141 has two edges connecting to a neighboring stator plate sector 141, on which a protrusions and a recesses 143 are respectively placed, allowing to fasten neighboring stator plate sectors 141 to each other. Each of the stator plate sectors 141 has positioning projections 144 of circular, square or other suitable shapes and positioning depressions 144a at an opposite side, allowing to stack plates on each other, so that the stator plate assembly 14 has a predetermined thickness. Each of the stator plate sectors 141 on the edges thereof has seats 145, 146 for accommodating one of the electric coils 15.

Furthermore, each of the stator plate sectors 141 has a fixing hole 147, allowing a bolt or a screw to be led through for fastening the stator plate assembly 14 on the stator plate holder 13.

Referring to FIGS. 6, 8 and 9, the electric coils 15 have a number of magnetic poles that is selected to be compatible with the number of magnetic poles of the permanent magnets 21, so that a field difference results. The number of electric coil poles and the number of permanent magnet poles are equal, or substantially equal, where substantially equal is within two, as shown in one preferred embodiment illustrated in FIG. 1 where the number of electric coil poles is 18 and the number of permanent magnet poles is 16. Each of the electric coils 15 is separately wound on a sector of the stator plate assembly 14. The stator sector assembly 14 has plates that are made of silicon steel with good magnetic properties and are preferably stacked on each other. Each plate of the stator sector assembly 14 consists of at least two stator plate sectors 141. Each stator plate sector 141 has two edges connecting to a neighboring stator plate sector 141, on which a protrusions and a recesses 143 are respectively placed, allowing to fasten neighboring stator plate sectors 141 to each other. Each of the stator plate sectors 141 has positioning projections 144 of circular, square or other suitable shapes and positioning depressions 144a at an opposite side, allowing to stack plates on each other, so that the stator plate assembly 14 has a predetermined thickness. Each of the stator plate sectors 141 on the edges thereof has seats 145, 146 for accommodating one of the electric coils 15.

To summarize, the present invention has a stator plate assembly and a rotor magnet retainer assembly having single plates which are further divided into sectors. Production thereof by punching is fast and allows for precise and easy accommodating of permanent magnets. Furthermore, waste material during production is minimized, even waste material from other production processes is usable, so that costs are greatly reduced.

While the invention has been described with reference to preferred embodiments thereof, it is to be understood that modifications or variations may be easily made without departing from the spirit of this invention which is defined by the appended claims.

The invention claimed is:

1. An electric motor comprising:
a stator assembly, further comprising
  a stator axle,
  a plurality of electric coils, forming a plurality of electric coil magnetic poles,
  a stator plate holder, coaxial to fixed on said stator axle and fixed on an outer surface thereof,
  at least one stator plate assemblies mounted on said stator plate holder, each of said stator plate assemblies further comprising
    a plurality of stacks of stator sector plates, each of said stator sector plates having at least one elongated alignment ridge diametrically oriented on a middle portion of a first major surface thereof, and at least one matching alignment valley opposingly positioned on a second major surface of said sector plates for nesting with said alignment ridge of an adjacent stator sector plate thereby maintaining alignment within said stack of stator sector plates, at least one fixing hole, centrally located, for fixing said stacks of stator sector plates to said stator plate holder, and at least one of said plurality of electric coils, wound around each of said stacks of stator sector plates; and
a rotor assembly, coaxial to and outward of said stator assembly, further comprising
  a casing, coaxial to said stator axle,
  a plurality of permanent magnets, forming a plurality of permanent magnet poles, said plurality of permanent magnet poles being substantially equal in number to the number of said plurality of electric coil magnetic poles,
  a rotor magnet retainer plate assembly, placed coaxial to and fixed to an inward surface of said casing, further comprising a stack of rotor plates, each of said rotor plates having an inner radius and an outer radius; and comprising a plurality of rotor sector plates with each of said rotor sector plates having at least one elongated alignment ridge oriented substantially parallel to said outer radius near each of a first and a second end portion of a first major surface thereof, at least one matching alignment valley opposingly positioned on a second major surface for nesting with said alignment ridge of an adjacent rotor sector plate, thereby maintaining alignment within said stack of rotor sector plates, and said plurality of permanent magnets being mounted on an inward surface of said stack of rotor plates;

wherein each of said rotor magnet retainer assemblies has a holding groove for accommodating each of said at least one permanent magnets.

2. The electric motor according to claim 1, wherein said rotor plate sectors of said rotor magnet retainer assembly have edges with mating protrusions and recesses.

3. The electric motor according to claim 2, wherein said rotor plate sectors are connected edge-to-edge by mating protrusions and recesses in a circular direction, forming monolayer annular rotor plates, which are stacked to form the rotor plate assembly.

4. The electric motor according to claim 2, wherein said mating protrusions and recesses have zigzagging shapes.

5. The electric motor according to claim 2, wherein said mating protrusions and recesses have wavelike shapes.

6. The electric motor according to claim 2, wherein said mating protrusions and recesses have linear shapes.

7. The electric motor according to claim 1, wherein said rotor assembly further comprises a brake.

8. The electric motor according to claim 1, wherein said rotor assembly and said stator assembly have a linear shape.

* * * * *